United States Patent [19]

Fletcher et al.

[11] 3,806,815

[45] Apr. 23, 1974

[54] DECISION FEEDBACK LOOP FOR TRACKING A POLYPHASE MODULATED CARRIER

[76] Inventors: James C. Fletcher, Administrator of the National Aeronautics and Space Administration with respect to an invention of; Marvin K. Simon, 325 Canon Depariso Ln., La Canada, Calif. 91101

[22] Filed: Mar. 6, 1973

[21] Appl. No.: 338,484

[52] U.S. Cl. .................. 325/320, 329/122, 325/419

[51] Int. Cl. ............................................ H04b 1/16

[58] Field of Search ............. 325/45, 47, 48, 63, 60, 325/345, 346, 348, 418, 419, 422, 30, 163, 320; 179/15 AN, 15 FD; 343/205, 206; 178/67, 88; 329/50, 122–125

[56] References Cited

UNITED STATES PATENTS

| | | | |
|---|---|---|---|
| 3,745,255 | 7/1973 | Fletcher et al. | 325/419 |
| 3,710,261 | 1/1973 | Low et al. | 325/346 |
| 3,465,258 | 9/1969 | Wheatley et al. | 325/419 |
| 3,568,067 | 3/1971 | Williford | 325/320 |
| 3,514,719 | 5/1970 | Rhodes | 325/50 |
| 3,701,948 | 10/1972 | McAuliffe | 325/60 |

*Primary Examiner*—Robert L. Richardson
*Assistant Examiner*—Jin F. Ng
*Attorney, Agent, or Firm*—Monte F. Mott; John R. Manning; Paul F. McCaul

[57] ABSTRACT

A multiple phase modulated carrier tracking loop for use in a frequency shift keying system is disclosed in which carrier tracking efficiency is improved by making use of the decision signals made on the data phase transmitted in each T-second interval. The decision signal is used to produce a pair of decision-feedback quadrature signals for enhancing the loop's performance in developing a loop phase error signal.

3 Claims, 6 Drawing Figures

DECISION FEEDBACK LOOP FOR TRACKING A POLYPHASE MODULATED CARRIER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to phase-shift-keying (PSK) communications, and more particularly to increasing carrier tracking efficiency and data detection performance when using PSK with more than two phases, i.e., multiple phase-shift-keying (MPSK).

When the data to be transmitted is binary, the data symbols can either be biphase modulated on a subcarrier, which in turn phase modulates the carrier, or directly biphase modulated on the carrier. In the former case, a discrete carrier component exits in the signal spectrum, hence the term discrete carrier transmission. In the latter case, there is no spectral component at the carrier frequency hence the term suppressed-carrier transmission. Also, in the discrete carrier case, the subcarrier would be completely suppressed, hence the term suppressed-subcarrier transmission applies in addition. Since N-phase modulation is a generalization of biphase modulation to more than two phases, N-aray data can be transmitted by either N-phase modulating a subcarrier which in turn phase modulates the carrier or N-phase modulating the carrier directly. Since the N-phase tracking loop in this invention can be used either as a subcarrier-tracking loop in the former case or as a carrier-tracking loop in the latter case, we shall not make the distinction in what follows and proceed to use the term "carrier" to cover both cases.

The idea of feeding back the decisions on detected binary data symbols to improve carrier tracking efficiency relative to that of other types of suppressed-carrier tracking loops has been described in U.S. Pat. No. 3,710,261, for a system for tracking a biphase modulated carrier and titled DATA-AIDED CARRIER TRACKING LOOPS. Briefly, for the suppressed-carrier case a multiplier cross-correlates the biphase modulated carrier signal with the loop reference signal supplied by the voltage-controlled oscillator (VCO). This signal is then put into a matched filter and decision device to provide an estimate of the input data symbol sequence. A 90° phase shifter couples the loop reference signal to a multiplier to produce a quadrature signal which is then delayed by an element, the delay time of which is equal to the reciprocal of the data rate of the received signal. The delayed signal is multiplied in a multiplier by the estimate $\hat{d}(t)$ of the transmitted data symbol sequence. The output of the multiplier is filtered by a loop filter to produce the control signal for the VCO.

The novelty of the prior application lies in the concept of bootstrapping the suppressed carrier-tracking loop with the data detector's decisions which are in turn made in the presence of the noisy carrier reference supplied by the suppressed carrier-tracking loop itself.

When polyphase modulation of an order greater than biphase modulation is employed, i.e., when N-aray PSK modulation is employed with N greater than 2, an N-phase decision-feedback carrier tracking loop is required in order to practice the concept of the prior application. It has been discovered that although additional elements are required, the additional complexity is independent of N, the number of signal phases transmitted.

SUMMARY OF THE INVENTION

A tracking loop for reconstructing a carrier reference signal from an N-phase modulated carrier, $x(t)$, where N is a power of 2 greater than 1, is comprised of: a voltage controlled oscillator for generating the reference signal, $r_u(t)= \sqrt{2}K_1\cos\phi(t)$; a 90° phase-shift network for providing a quadrature phase reference signal, $r_l(t)=-\sqrt{2}K_1\sin\phi(t)$; two multipliers for producing the product signals $\epsilon_u(t)=x(t)r_u(t)$ and $\epsilon_l(t)=x(t)r_l(t)$; phase estimating means responsive to those product signals for producing a signal, $\hat{\theta}_k$, that is proportional to an estimate of the transmitted symbol phase; means responsive to the phase estimate signal, $\hat{\theta}_k$, for generating signals equal to $\cos\hat{\theta}_k$ and $\sin\hat{\theta}_k$; means for delaying the signals $\epsilon_u(t)$ and $\epsilon_l(t)$, a period equal to the signal transfer delay through the phase estimating means and the function generating means; means for multiplying the delayed signals $\epsilon_u(t)$ and $\epsilon_l(t)$ by the respective signals $\cos\hat{\theta}_k$ and $\sin\hat{\theta}_k$ to obtain upper and lower feedback loop signals $z_u(t)$ and $z_l(t)$; summing means for adding the upper and lower feedback loop signals into a single phase error signal $\epsilon(t)$, and a low-pass filter for coupling that phase error signal to the voltage controlled oscillator (VCO).

The novel features that are considered characteristic of this invention are set forth with particularity in the appended claims. The invention will best be understood from the following description when read in connection with the accompanying drawings.

DESCRIPTION OF THE PREFERRED EMBODIMENT

The reconstruction of a carrier reference from a polyphase modulated carrier can be accomplished with a loop which employs the phase-lock principle and makes use of descision feedback. This will not only increase carrier-tracking efficiency, but also permit improved data detection performance.

Figure 1:
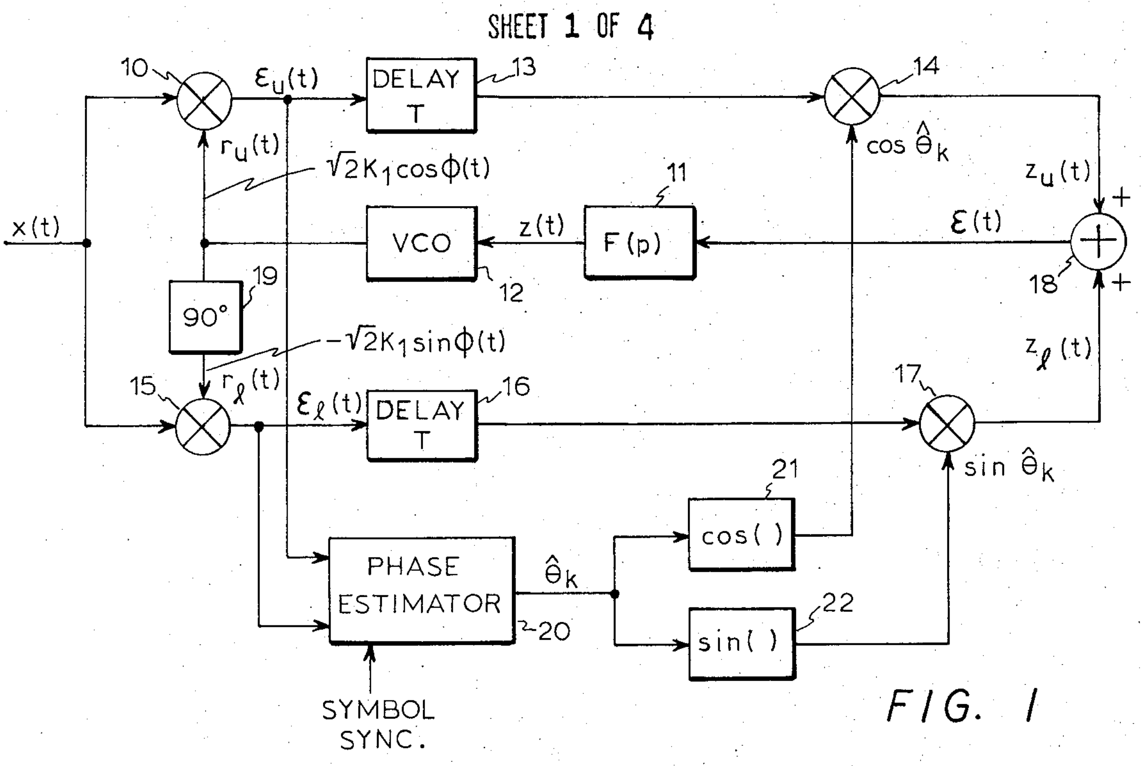
FIG. 1 is a schematic diagram of the present invention.

Referring to FIG. 1, a phase-locked loop is shown comprised of a multiplier 10, such as a double balanced diode mixer, a low-pass (time invariant) filter 11, and a voltage controlled oscillator (VCO) 12. To these basic elements of a phase-locked loop, additional elements are added as shown, namely: a delay element 13 and multiplier 14 in an upper loop; a multiplier 15, delay element 16, and multiplier 17 in a lower loop; a summing network 18 to combine the signals $z_u(t)$ and $z_l(t)$ of the two loops into one phase error signal $\epsilon(t)$; a 90° phase shift network 19 for quadriture multiplication of the input signal $x(t)$; and a phase estimator 20 followed by cosine and sine function generators 21 and 22 coupling the output, $\hat{\theta}_k$, of the phase estimator to the multipliers 14 and 17.

The multipliers 10 and 15 are needed to provide the inputs $\epsilon_u(t)$ and $\epsilon_l(t)$ to the phase estimator 20 for the data detection portion of an optimum receiver. See Chapter 5 of *Principles of Coherent Communication*, McGraw-Hill, Inc. (1966) by Dr. Andrew J. Viterbi (in particular FIG. 5.2 which applies for $N$=2 only). Consequently, they may be regarded as the input stage of the data detection section of an optimum correlation receiver of polyphase signals. The additional elements, namely the cosine and sine function generators, the delay elements, and the cosine and sine multipliers, represent a minimum of additional complexity for implementing this improved tracking loop. Also, this additional complexity is independent of N, the number of signal phases transmitted, although for convenience N is restricted to some power of 2 greater than one.

Figure 2:
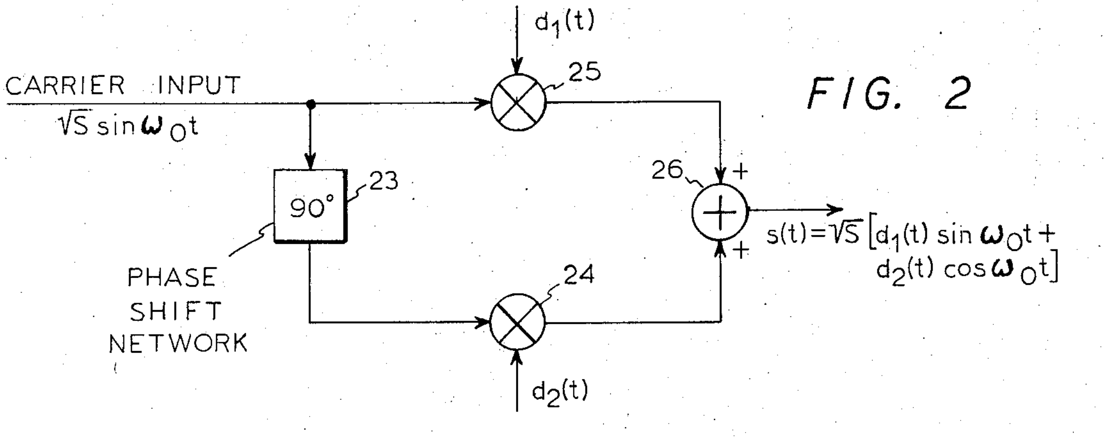
FIG. 2 is a schematic diagram of a quadriphase modulator useful in understanding the nature of a quadriphase modulated carrier to be tracked by the invention shown in FIG. 1.
Figure 3:
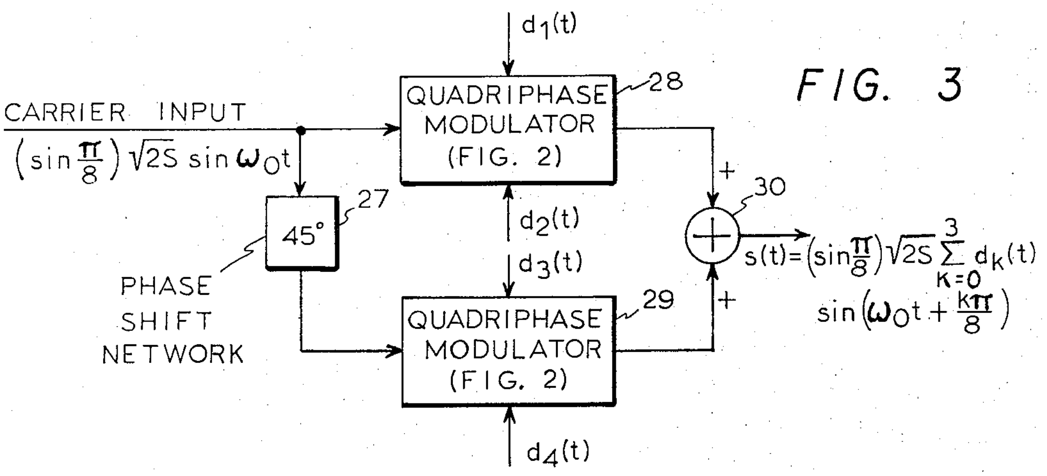
FIG. 3 illustrates how two quadriphase modulators may be combined to mechanize an octaphase modulator.

A discussion of the N-phase decision feedback loop of FIG. 1 requires some understanding of the transmitter and receiver characteristics. FIGS. 2 and 3 illustrate the mechanization of quadriphase and octaphase modulators. During a transmission interval of T seconds the transmitted signal is assumed to be characterized by the polyphase signal $$s(t) = \sqrt{2}s \sin(\omega_o t + (2k+1)\pi/N),$$
$$k=0, 1, 2, \ldots, N-1 \qquad (1)$$

where $\omega_o$ is the carrier radian frequency. For almost all applications $N$ is a power of 2 and will be so assumed hereinafter. For $N$=4 the above signaling format represents quadriphase-shift-keying while for $N$=8 it corresponds to octaphase-shift-keying. In the quadriphase case, the transmitted signal in (1) assumes the form $$s(t) = \sqrt{S}[d_1(t)\sin\omega_o t + d_2(t)\cos\omega_o t], \qquad (2)$$

where $d_1(t)$ and $d_2(t)$ are $\pm 1$ digital waveforms whose transitions may occur at intervals of T-seconds.

For quadriphase signaling, the above Equation (2) suggests the modulator depicted in FIG. 2. Briefly, a 90° phase shift network 23 couples the carrier input to a multiplier 24 which receives the modulating data $d_2(t)$. A multiplier 25 receives the carrier input directly and the modulating data $d_1(t)$. The two modulated signals are then combined in a summing circuit 26. Setting $N$=8 for octaphase modulation, it is easy to show that the circuit in FIG. 3 generates an octaphase signal. Here a 45° phaseshift 27 is employed with two quadriphase modulators 28 and 29 connected to a summing circuit 30. Each quadriphase modulator is identical to the modulator of FIG. 2. In this figure $d_3(t)$ and $d_4(t)$ also correspond to data sequences of $\pm 1$. The generalization of the transmitter modulator to a number of phases $N$ greater than 8 is straightforward.

If one assumes that the channel adds white Gaussian noise $n(t)$ of single-sided spectral density $N_0$ watts/Hertz and a possible phase and Doppler shift to the signal $s(t)$, then the received signal can be characterized by $$y(t) = s[t, \theta(t)] + n(t)$$
$$= \sqrt{2S}\sin(\omega_o t + \theta(t) + (2k+1)\pi/N) + n(t) \qquad (3)$$

where $\theta(t) \triangleq \theta_o + \Omega_o t$; $\theta_o$ is a uniformly distributed random phase and $\Omega_o$ is the shift in the input frequency from its nominal value of $\omega_o$. Under these assumptions it can be shown that if the transmitted signals are equiprobable, then the optimum receiver (assuming perfect synchronization) is mechanized by $N/2$ multipliers followed by integrate-and-dump circuits and decision logic.

If the polyphase modulation scheme discussed with reference to FIGS. 2 and 3 is to be successfully applied, an efficient and accurate method is needed in the receiver for establishing coherent reference signals. Moreover, the receiver must be capable of tracking the carrier phase without concern for which of the data signals is phase modulating the carrier. The N-phase decision feedback loop of FIG. 1 satisfies this requirement.

Operation of the N-phase decision feedback loop will now be described. It assumes that inphase and quadriture demodulated carrier signals, along with the symbol synchronization signal, are applied to the phase estimator 20 mechanized to provide a phase estimate $\hat{\theta}_k$ in the same manner as for a conventional correlation receiver. The sample period T is thus controlled by the SYMBOL SYNC signal derived from the carrier input. Consequently, in each T-second interval, a decision $\hat{\theta}_k$ on the transmitted phase symbol $\theta_k=(2k+1)\pi/N$ is used to produce the decision-feedback signals.

It is evident that the transfer function factor $\exp(pT)$ with $p=j\omega$ of the upper and lower loops affects loop stability and reduces the signal acquisition or pull-in range. However, this invention does not pertain to the theory of these problems. Consequently, a simplifying assumption is made in order to neglect the transfer function in regard to predicting steady-state performance, namely that $W_l T << 1$, which is the usual case of interest, where $W_L$ is the two-sided linear loop bandwidth. Under these assumptions, the dynamic error at the input of the loop filter becomes $$\epsilon(t) = K_1 K_m \{\sqrt{S}\cos(\theta_k = \hat{\theta}_k)\sin\phi(t)$$
$$+ \sqrt{S}\sin(\theta_k - \hat{\theta}_k)\cos\phi(t)$$
$$+ \cos\hat{\theta}_k N_u[t, \phi(t)] + \sin\hat{\theta}_k N_l[t, \phi(t)]\} \qquad (4)$$

where $N_u[t, \phi(t)]$ and $N_l[t, \phi(t)]$ are uncorrelated noise processes that are modelled as $$N_u[t, \phi(t)] = N_c(t)\cos\phi(t) = N_s(t)\sin\phi(t)$$
$$N_l[t, \phi(t)] = N_c(t) + N_s(t)\cos\phi(t) \qquad (5)$$

The output of the loop filter in the tracking mode can be expressed in terms of the circular moments of $\theta_k - \hat{\theta}_k$, viz., $$z(t) = K_1K_mF(p)\ \{\sqrt{S}\,\overline{\cos(\theta_k-\hat{\theta}_k)}\,\sin\phi(t) + \sqrt{S}\,\overline{\sin(\theta_k-\hat{\theta}_k)}\,\cos\phi(t) + \cos\hat{\theta}_kN_u[t,\phi(t)] + \sin\hat{\theta}_kN_l[t,\phi(t)\ ]\}. \quad (6)$$

This discrete random variable $\theta_k-\hat{\theta}_k$ ranges over the set of allowable values $2j\ \pi/N; j=0,\pm N/2-1$, N/2 with probabilities $$P_j(\phi) \overset{\Delta}{=} Pr\ \{\theta_k-\hat{\theta}_k = 2j\pi/N\}$$

$$= \frac{1}{\pi}\int_0^{\infty}\Big[\exp\{-(u-\sqrt{R_d}\cos\phi)^2\} \cdot \int_{u\tan[(2j-1)\pi/N]}^{u\tan[(2j+1)\pi/N]}\exp\{-(v-\sqrt{R_d}\sin\phi)^2\}dv\Big]\,du \quad (7)$$

where we have assumed that the loop phase error $\phi(t)$ is essentially constant over several signalling intervals. Equation (7) can be derived from the law of total probability.

$$\sum_{j=-N/2+1}^{N/2} P_j(\phi) = 1. \quad (8)$$

Thus from Equations (7) and (8), the circular moments of $\theta_k-\hat{\theta}_k$ can be expressed as $$\overline{\sin(\theta_k-\hat{\theta}_k)} \overset{\Delta}{=} \sum_{j=-N/2+1}^{N/2} P_j(\phi)\sin(2j\pi/N) = \sum_{j=-N/2+1}^{N/2} P_j(\phi)\sin(2j\pi/N)$$

$$\overline{\cos(\theta_k-\hat{\theta}_k)} \overset{\Delta}{=} \sum_{j=-N/2+1}^{N/2} P_j(\phi)\cos(2j\pi/N) = P_0(\phi) + \sum_{j=-N/2+1}^{N/2} P_j(\phi)\cos(2j\pi/N) \quad (9)$$

where the prime on the summation denotes omission of the $j=0$ term and $P_0(\phi)$ is the conditional probability that the decision on $\theta_k$ is correct given the phase error $\phi$. Thus, letting $$P_E(\phi) \overset{\Delta}{=} 1-P_0(\phi) = \sum_{j=-N/2+1}^{N/2} P_j(\phi) \quad (10)$$

Equation (9) may be expressed in the equivalent form $$\overline{\sin(\theta_k-\hat{\theta}_k)} = \sum_{j=-N/2+1}^{N/2} P_j(\phi)\sin(2j\pi/N)$$

$$\overline{\cos(\theta_k-\hat{\theta}_k)} = 1-2P_E(\phi) + \sum_{j=-N/2+1}^{N/2} P_j(\phi)[1+\cos(2j\pi/N)] \quad (11)$$

Substituting Equation (11) into Equation (6) and recalling that $$\phi(t) = \theta(t) - K_vz(t)/p \quad (12)$$

the stochastic integro-differential equation of operation for the N-phase decision-feedback loop of FIG. 1 becomes (omitting the dependence on $t$)

$$\dot{\phi} = \dot{\theta} - KF(p)\{\sqrt{S}[1-2P_E(\phi)]\sin\phi + \sqrt{S}\sum_{j=-N/2+1}^{N/2} P_j(\phi)\sin[1+\cos(2j\pi/N)] + \sqrt{S}\sum_{j=-N/2+1}^{N/2} P_j(\phi)\cos\phi\,[\sin(2j\pi/N)] + \cos\hat{\theta}_kN_u(t,\phi) + \sin\hat{\phi}_kN_l(t,\phi)\} \quad (13)$$

where $K \overset{\Delta}{=} K_1K_mK_v$. Recognizing from Equation (7) that $P_j(\phi) = P_{-j}(-\phi)$, the second and third terms of Equation (13) are odd functions of $\phi$ and as such contribute to the overall tracking error characteristic.

From the foregoing it may be seen that the circuit of FIG. 1 receives an N-phase modulated carrier, $x(t)$, and generates phase error signals $$\epsilon_u(t) = x(t)\,r_u(t)$$
$$\epsilon_l(t) = x(t)\,r_l(t)$$

where $r_u(t)$ is the reference signal $\sqrt{2}\,K_1\cos\phi(t)$ at the output of the oscillator 12, and $r_l(t)$ is the quadrature reference signal $-\sqrt{2}\,k_1\sin\phi(t)$. These quadrature phase error signals $\epsilon_u$ and $\epsilon_l$ are processed in the phase estimator 20 to produce a phase estimate signal, $\hat{\theta}_k$, that is a decision on the transmitted phase symbol $\theta_k=(2k+1)\pi/N$. That signal is processed by cosine and sine function generators 21, 22 to produce a pair of quadrature decision-feedback signals. The phase error signal $\epsilon_u$ and $\epsilon_l$ are multiplied by these quadrature decision-feedback signals to generate upper and lower signals $z_u(t)$ and $z_l(t)$. The delay elements 13 and 16 are adjusted to be equal to the signal transfer delay through the phase estimator and function generators. The signals $z_u(t)$ and $z_l(t)$ are then added to produce a single signal $\epsilon(t)$ which is filtered to provide an oscillator control signal $z(t)$.

Although the phase estimator is conventional, and not per se the invention, a more complete description of the phase estimator for an N-phase modulated carrier will now be set forth with reference to FIGS. 4, 5 and 6 in order to more fully understand how the feedback signal is data-aided.

Figure 4:
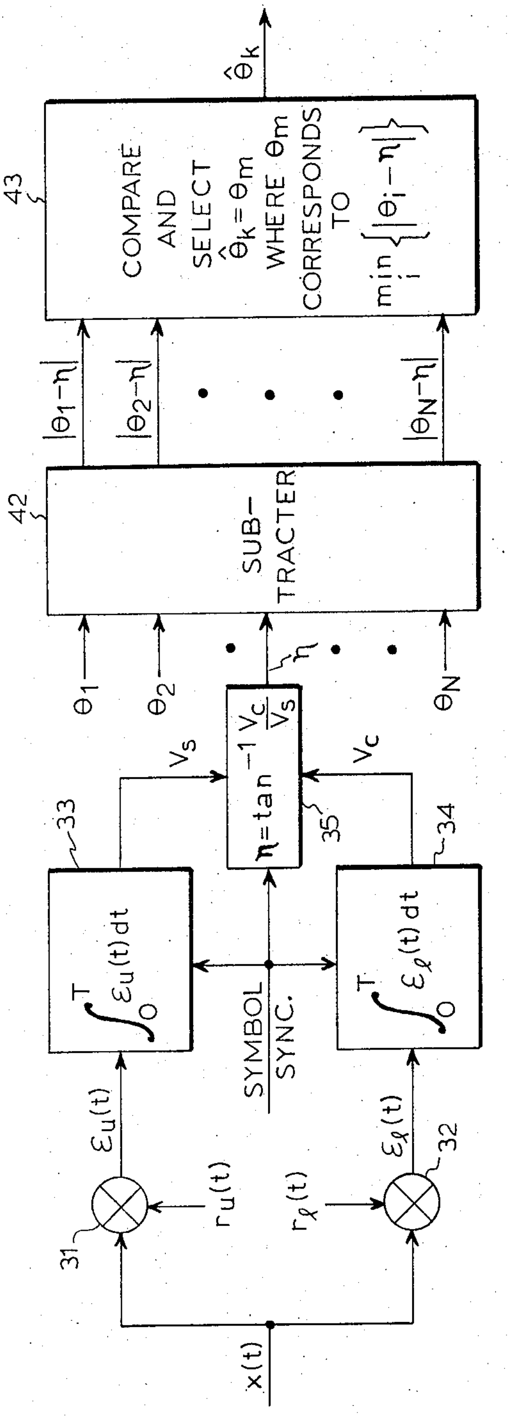
FIG. 4 illustrates the mechanization of a phase estimator in a receiver employing the invention of FIG. 1.
Figure 5:
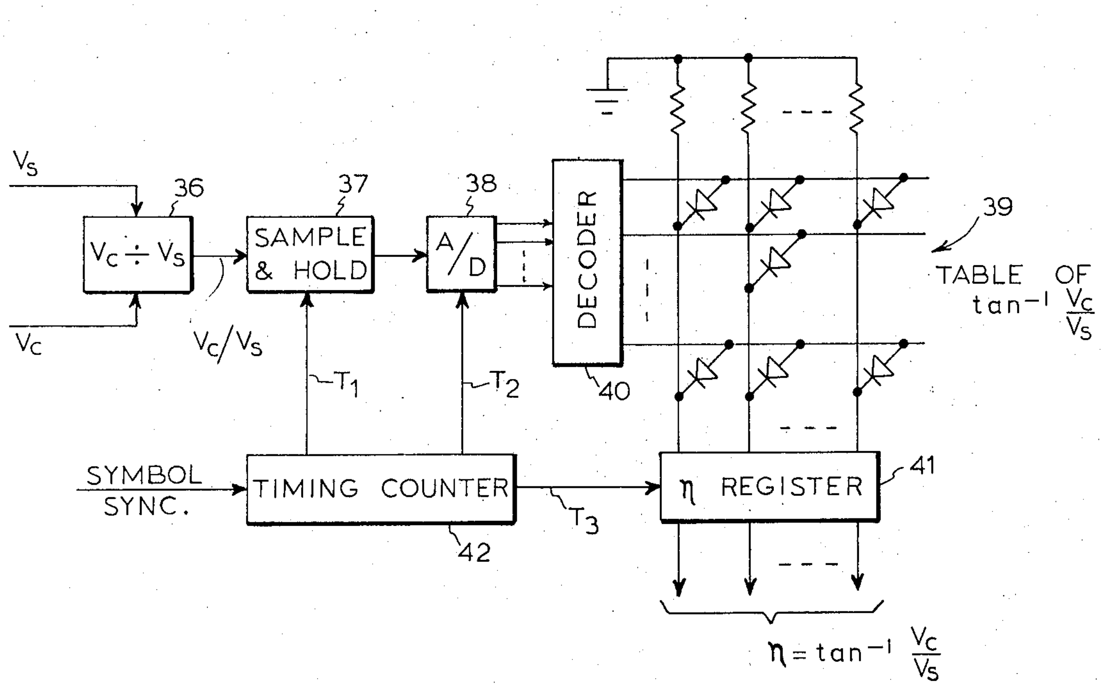
FIG. 5 illustrates an exemplary logic network for implementing the function $\tan^{-1} V_c/V_s$.

A phase estimator for an optimum correlation receiver is shown in FIG. 4 and described by Eugene A. Trabka in a Memorandum No. 5A titled "Embodiments of the Maximum Likelihood Receiver For Detection of Coherent Pulsed Phase Shift Keyed Signals in the Presence of Additive White Gaussian Noise," published in ASTIA Document No. AD No. 256584, Investigation of Digital Data Communications Systems, Report No. UA-1420-S-1 under Contract No. AF 30 (602) – 2210 dated Jan. 3, 1961. It requires only two multipliers 31 and 32, and two integrate-and-dump circuits 33 and 34.

If symbol synchronization is to be derived from the received signal, symbol synchronization equipment must also be incorporated into the receiver. Such a receiver mechanization is conventional and is indicated by a SYMBOL SYNC signal into the circuits 33 and 34. As suggested hereinbefore, the demodulating functions of the multipliers 31 and 32 may be carried out by the multipliers 10 and 15 of the carrier tracking loop, i.e., the signals $r_u(t)$ and $r_l(t)$ in an optimum correlation receiver for a polyphase modulated carrier are the same signals $r_u(t)$ and $r_l(t)$ employed in the carrier tracking loop.

At the end of each symbol period T, the outputs $V_s$ and $V_c$ of the integrators 33 and 34 are entered into a function generator 35 to generate an output signal $\eta$ equal to the arctangent of the ratio $V_c$:$V_s$. At the same time, the integrators 33 and 34 are dumped (reset) to start a new integration period. The integration may, in practice, be accomplished by digital accumulators if analog-to-digital converters are included between the multipliers and the integrators.

The function generator 35 may also be implemented with digital techniques, particularly if the accumulators are digital; if not, the signals $V_s$ and $V_c$ can be easily sampled and converted to digital form at the inputs to the function generator 35. The arctangent of $V_c/V_s$ may then be formed directly in digital form, such as by addressing fixed-store tables of values using $V_c$ to address a selected table, and $V_s$ to enter the selected table and gate out the value $\eta$. Alternatively, only one table need be stored if the ratio $V_c$:$V_s$ is first formed. Since that is more easily done using analog techniques, it would be preferable to implement the integrators using analog techniques. Then the input stage to the function generator 35 may be an analog dividing circuit 36 shown in FIG. 5. The analog output of that circuit can be then sampled by a conventional sample-and-hold circuit 37 and converted to digital form by a following analog-to-digital converter 38. The ratio $V_c$:$V_s$ in digital form can then be used to address a single table 39 of values for the desired arctangent. The table may consist of a diode matrix, as shown, addressed by the analog-to-digital converter 38 through a decoder 40 which energizes one line for each quantized value of the ratio $V_c$:$V_s$. Diodes at predetermined locations in the matrix then permit the decoder to energize only selected output terminals connected to a register 41. A timing counter 42 initiates a sequence of timing signals $T_1$, $T_2$ and $T_3$ in response to a SYMBOL SYNC signal to program the operations, the last of which is to enter the output of the table 39 into the register 41 after the analog-to-digital conversion has been completed.

The next section 42 of the phase estimator shown in FIG. 4 subtracts the value of $\eta$ entered into the register 41 from stored values of phases $\theta_1$, $\theta_2$, . . . $\theta_N$, using a separate direct subtracter for each phase. For example, in a quadriphase modulation system, the four phases $\theta_1$ through $\theta_4$ are stored in digital form in static registers. Each subtracter connected to a different phase register continually receives the current digital output of the register 41 and thereby continually presents the differences $|\theta_1-\eta|$, $|\theta_2-\eta|$, . . . and $|\theta_N-\eta|$. Since only the absolute values of the differences are required, the signs of the differences are ignored. In the last section 43 of the phase estimator, all of the differences are compared with each other to select the phase estimate $\hat{\theta}_k$ as equal to $\theta_m$, where $\theta_m$ corresponds to the phase $\theta_i$ which yields the minimum difference $|\theta_i-\eta|$. Comparison of differences can be done using digital logic, and once the minimum is found, the output of the logic network is used to gate out the stored phase $\theta_i$ in digital form as the phase estimate $\hat{\theta}_k$. Once gated out, that value may be converted to digital form.

Figure 6:
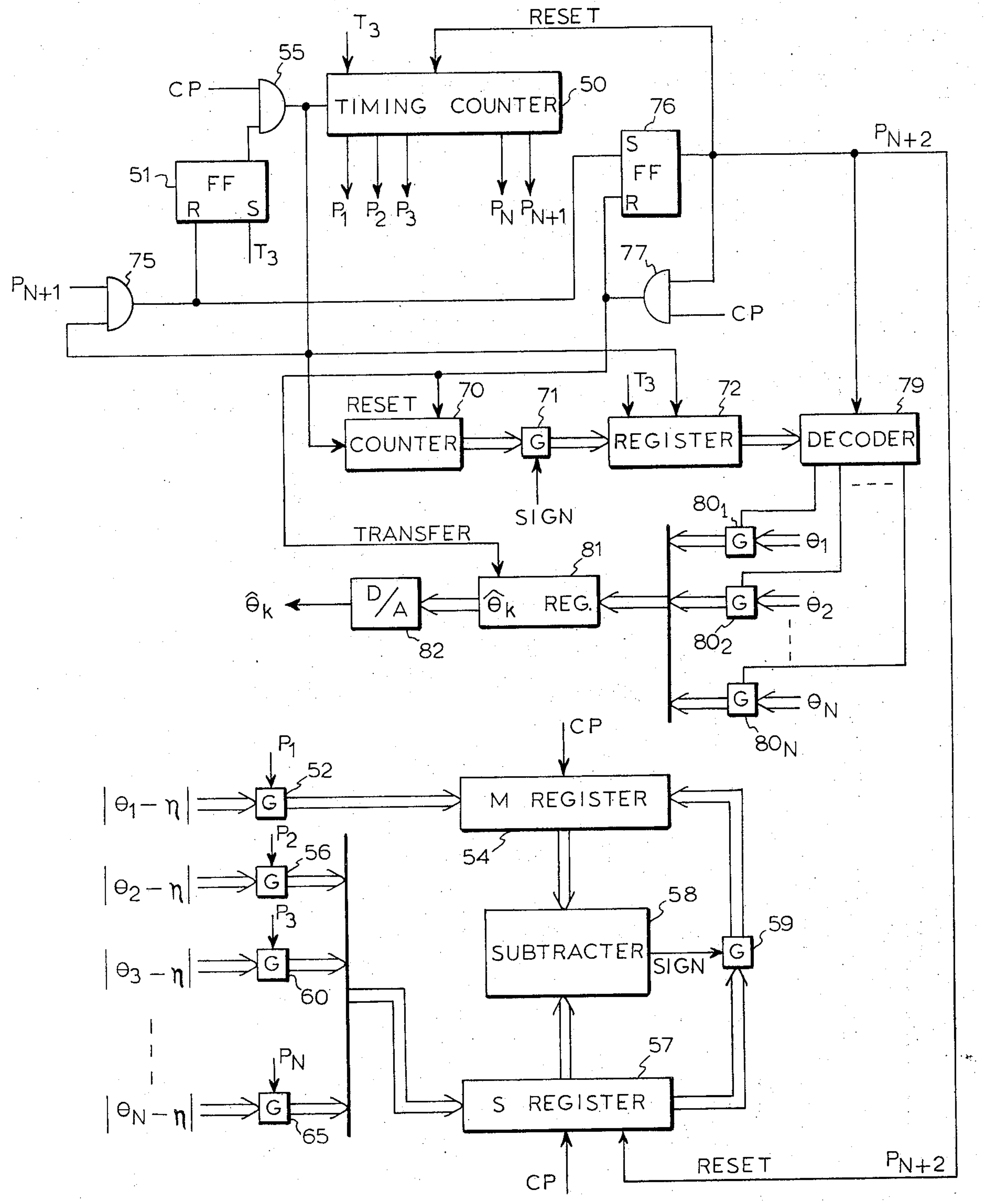
FIG. 6 illustrates an exemplary logic network for implementing the output section of the phase estimator in FIG. 4.

FIG. 6 illustrates an exemplary logic network for implementing the last section 43 using digital techniques. After an appropriate delay time following a SYMBOL SYNC pulse, the timing signal $T_3$ (FIG. 5) presets a timing counter 50 to one to produce a timing pulse $P_1$, and sets a flip-flop 51. The pulse $P_1$ enables a bank of AND gates 52. The next pulse from a clock pulse generator (not shown), which generates all clock pulses, CP, used for operating digital networks of the receiver, causes the first difference $|\theta_1-\eta|$ transmitted by enabled gates 52 to be entered in parallel into a minuend (M) register 54. The set flip-flop 51 enables an AND gate 55 to transmit that same clock pulse to advance the counter 50 and thereby produce a timing pulse $P_2$ to enable a bank of AND gates 56. The next clock pulse causes the second difference $|\theta_2-\eta|$ transmitted by enabled gates 56 to be entered in parallel into a subtrahend (S) register 57. Now for the first time a subtracter 58 may produce a positive sign if the subtrahend was smaller than the minuend. If so, it enables a bank of AND gates 59 to transmit the subtrahend to the M register where it is entered by the next clock pulse while the next difference $|\theta_3-\eta|$ is entered into the S register via a bank of AND gates 60 during the timing pulses $P_3$. If not, the contents of the M register remain undisturbed while the difference $|\theta_3-\eta|$ is being entered into the S register.

The process continues until the timing pulse $P_N$ enables a bank of AND gates 65 to transmit the last difference $|\theta_N-\eta|$ 68 each time transferring the subtrahend to the M register in response to a positive sign from the subtracter if the subtrahend is smaller. The result is that the last difference $|\theta_i-\eta|$ transferred to the M register is smallest. The $\theta_i$ of that difference is then to be selected as the estimate $\hat{\theta}_k$.

In order to known which $i$ corresponds to the difference $|\theta_i-\eta|$ in the M register at the end of the comparison process, a counter 70 is incremented by clock pulses transmitted through the AND gate 55. Note that these clock pulses occur at the end of each of the timing periods $P_1$ through $P_{N+1}$. Consequently, each time a subtrahend is transferred to the M register because the sign from the subtracter is positive, the count in the counter 70 is equal to the subscript $i$ of the subtrahend $|\theta_i-\eta|$ being transferred. For example, if $|\theta_1-\eta| > |\theta_2-\eta|$, the subtrahend is transferred. The counter 70 was incremented to 2 during timing pulse $P_2$ while $|\theta_2-\eta|$ was being entered into the S register. The transfer of $|\theta_2-\eta|$ takes place during timing pulse $P_3$ while $|\theta_3-\eta|$ is being entered into the S register. The positive sign signal (SIGN) which enables the transfer of $|\theta_2-\eta|$ enables a bank of AND gates 71 to transmit the content of the counter 70 to a register 72. There it is entered in response to a clock pulse. If the sign remains negative thereafter, the counter accurately indicates the subscript 2 of the minimum $|\theta_2-\eta|$.

At time $P_{N+1}$ all the comparisons have been made and $|\theta_N-\eta|$ is transferred to the M register from the S register if the sign is negative. If so, the count N from the counter 70 is entered into the register 71. The count goes to $N+1$ at that time in the counter 70, but that fact can be overlooked as no further entry into the register 72 is possible due to the gate 55 being disabled thereafter. In the event $|\theta_1-\eta|$ is the minimum, no count is ever entered into the register 72. In order that it will accurately store a count of 1 in that case, the $T_3$ timing signal presets the counter 72 to 1.

The flip-flop 51 is reset via an AND gate 75 by the last clock pulse transmitted through the gate 55. A flip-flop 76 is set at the same time by the clock pulses transmitted through the gate 75. The set flip-flop 76 will thereafter be reset by the very next clock pulse via an AND gate 77. The result is a timing pulse $P_{N+2}$ used to enable a decoder 79 to decode the count in the register 72 and enable an appropriate bank of AND gates $80_1$–$80_N$ to transmit the value of $\theta_i$ in digital form into a register 81 in response to the clock pulse that resets the flip-flop 76. That clock pulse also resets the counter 70. A digital-to-analog converter 82 then transmits a new value for the phase estimate $\hat{\theta}_k$. For quadriphase modulation, the estimate $\hat{\theta}_k$ can take only one of four values $\theta_1$, $\theta_2$, $\theta_3$ or $\theta_4$, and for octaphase one of eight values $\theta_1, \theta_2, \ldots \theta_8$.

The time required to determine the phase estimate $\hat{\theta}_k$ is significant, even if N is only 4, and not some power of 2 greater than 2, but that time is compensated by extending the delay of elements 13 and 16 sufficiently for the system to assure that the values of signals $\epsilon_u(t)$ and $\epsilon_l(t)$ on which the phase estimates are based are multiplied by the sine and cosine functions of that phase estimate. In that regard, it should be noted that since the phase estimate $\hat{\theta}_k$ can take on only one of a predetermined number of values, the sine and cosine function generators 21 and 22 can be implemented with table look-up techniques using the digital output of the register 81. Instead of providing the digital-to-analog conversion at the output of that register, the conversion would then be provided at the outputs of the sine and cosine table look-up logic networks.

Although a particular embodiment of the invention has been described and illustrated, it is recognized that modifications and variations may readily occur to those skilled in the art. Consequently, it is intended that the claims be interpreted to cover such modifications and variations.

What is claimed is:

1. A tracking loop for reconstructing a carrier reference signal, $r_u(t)$, from an N-phase modulated carrier, $x(t)$, where $N$ is an integer that is a power of 2 greater than 1, comprised of a voltage controlled oscillator for generating said reference signal, said oscillator having a control input terminal, a 90° phase-shift network connected to receive said reference signal and provide a quadrature phase reference signal, $r_l(t)$, means responsive to said modulated carrier and said reference signal for producing an inphase demodulated carrier signal, $\epsilon_u(t)$, equal to the product $x(t)\ r_u(t)$, means responsive to said modulated carrier and said quadrature phase reference signal for producing a quadrature demodulated carrier signal, $\epsilon_l(t)$, equal to the product $x(t)\ r_l(t)$, means responsive to said inphase and quadrature demodulated carrier signals for producing a phase-estimate signal, $\hat{\theta}_k$, proportional to an estimate of the phase of a transmitted symbol during each symbol period of said N-phase modulated carrier, cosine and sine function generating means responsive to said phase-estimate signal, $\hat{\theta}_k$, for generating cosine and sine signals equal to the functions cos $\hat{\theta}_k$ and sin $\hat{\theta}_k$, respectively, first and second means for delaying respective signals $\epsilon_u(t)$ and $\epsilon_l(t)$ a period equal to the signal transfer delay through said phase estimating means and said cosine function generating means, said period also being equal to the signal transfer delay through said phase estimating means and said sine function generating means, first and second means responsive to said inphase and quadrature demodulated carrier signals $\epsilon_u(t)$ and $\epsilon_l(t)$ and to said cosine and sine signals for producing first and second feedback signals $z_u(t)$ and $z_l(t)$, respectively, equal to the products thereof, namely $\epsilon_u(t)$ cos $\hat{\theta}_k$ and $\epsilon_l(t)$ sin $\hat{\theta}_k$, summing means for adding said first and second feedback signal into a phase error signal, $\epsilon(t)$, and a low-pass filter coupling said phase error signal $\epsilon(t)$ to said control input terminal of said voltage-controlled oscillator.

2. A tracking loop as defined in claim 1 wherein said means for producing said phase-estimate signal includes as input stages thereof said means for producing said inphase demodulated carrier signal, $\epsilon_u(t)$ and said means for producing said quadrature demodulated carrier signal $\epsilon_l(t)$.

3. A tracking loop as defined in claim 2 wherein said phase-estimate signal during each symbol synchronization period is the data phase of said N-phase modulated carrier.

* * * * *